United States Patent [19]  [11] 3,855,901
Girardi  [45] Dec. 24, 1974

[54] BROACHING MACHINE
[75] Inventor: Vincent J. Girardi, Grosse Pointe, Mich.
[73] Assignee: The Babcock & Wilcox Company, New York, N.Y.
[22] Filed: Oct. 15, 1973
[21] Appl. No.: 406,489

[52] U.S. Cl. ................................. 90/78, 308/5 R
[51] Int. Cl. ..................... B23d 37/18, F16c 29/02
[58] Field of Search ................... 90/69, 70, 78, 21; 308/5 R; 184/5, 100; 198/137

[56] References Cited
UNITED STATES PATENTS
3,512,848 5/1970 Uhtenwoldt......................... 308/5 R
3,568,569 3/1971 Haley.................................... 90/78

*Primary Examiner*—Gil Weidenfeld
*Attorney, Agent, or Firm*—Barnes, Kisselle, Raisch & Choate

[57] ABSTRACT

A broaching machine comprising a base and an endless broaching chain mounted on said base. A plurality of carriers are mounted at longitudinally spaced points on the chain for supporting a workpiece or broaching tools. A mounting fixture is positioned along a portion of the path of the carriers for supporting the workpiece or broaching tools. A slideway is provided along the path of the carriers adjacent the fixture and the slideway and carriers have complementary surfaces. Each of said surfaces of the slideway has longitudinally spaced cavities therein and capillary fluid passages associated therewith for supplying fluid to the cavities, the length and diameter of the capillaries and the size of the cavities being such that when a cavity is uncovered due to the absence of a carrier thereover, the fluid flows to the cavity freely and is at atmospheric pressure in the cavity. The length of each carrier is such that it covers a plurality of longitudinally spaced cavities as it is moved past the work station along said slideway and the length of the slideway is such that a plurality of cavities are uncovered at any moment of time during which a carrier is moved along said slideway. By supplying fluid to said cavities at least when a carrier is on said slideway each carrier is supported in stable, accurate frictionless relation to the slideway by fluid flow from said cavities between the complementary surfaces of said slideway and carrier.

9 Claims, 5 Drawing Figures

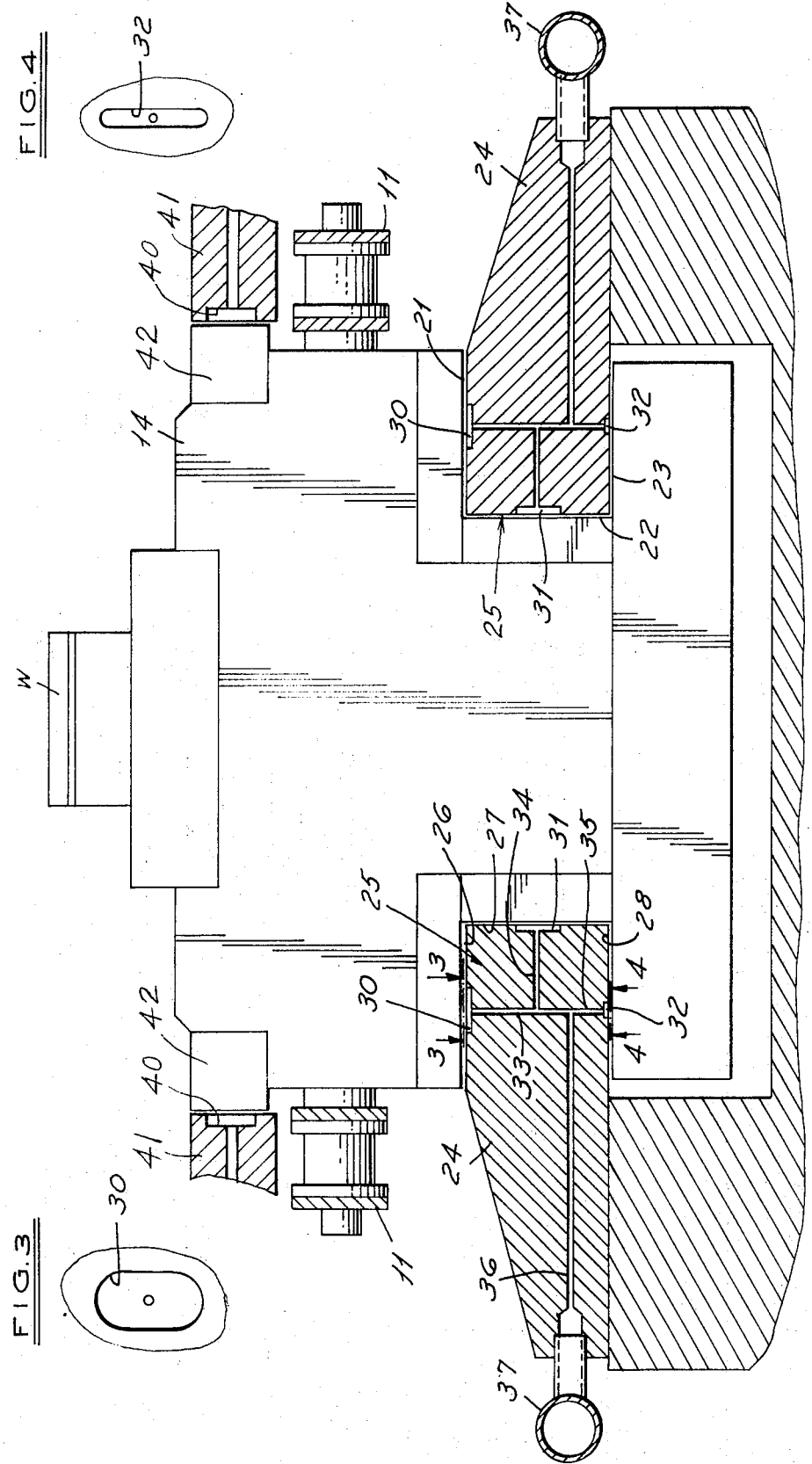

3,855,901

BROACHING MACHINE

This invention relates to broaching machines.

BACKGROUND OF THE INVENTION

In broaching machines it is common to provide carriers on endless chains, the carrier being adapted to support workpieces or broaching tools to move them through a work station where work can be performed on the other of a workpiece or tool at the station. In such a machine, substantial forces are encountered by the broaching operation and it is necessary for the carriers to be firmly supported. This commonly is done by slides and slideways through metal-to-metal contact in order to produce the desired force. Obviously, such a construction results in wear with loss of accuracy in the broaching operation as well as requiring maintenance of the machine.

Among the objects of the invention are to provide a broaching machine wherein a stable, accurate support of the carriers is achieved without resultant wear and the disadvantages thereof.

DESCRIPTION OF THE DRAWINGS

FIG. 2 is a fragmentary sectional view of an enlarged scale taken along the line 2—2 in FIG. 1.

FIG. 3 is a fragmentary view taken along the line 3—3 in FIG. 2.

FIG. 4 is a fragmentary view taken along the line 4—4 in FIG. 2.

DESCRIPTION

Figure 1:
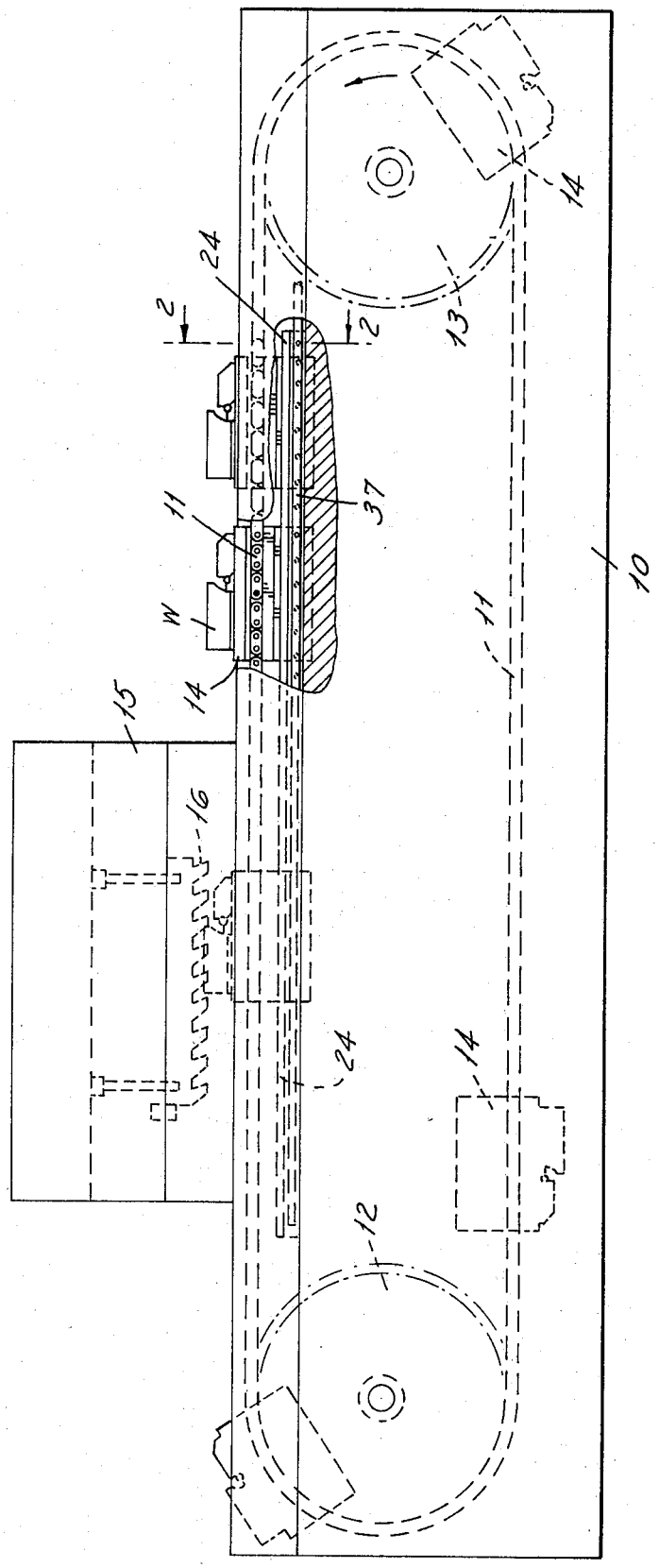
FIG. 1 is a part sectional elevational view of a broaching machine embodying the invention.

Referring to FIG. 1, the broaching machine embodying the invention comprises a base 10 on which a pair of chains 11 are supported for movement in an endless path of sprockets 12, 13 one of which is driven. The chain supports pallets or carriers 14 on which a workpiece W can be fixed for movement through a work station past a fixture 15 that supports a broach 16 for performing a broaching operation on the workpiece. As will be apparent from the description, the carriers 14 could support a broaching tool and the workpiece could be mounted on the fixture 15.

In accordance with the invention, a slideway 20 is formed for the carriers 14 as they move through the work station and comprises a top horizontal surface 21, an inwardly facing vertical surface 22 and a bottom surface 23 on each of slide bars or members 24. The carrier 14 has longitudinally extending recesses 25 defining complementary surfaces 26, 27 and 28.

In acccordance with the invention, each of the surfaces 21, 22, 23 is provided with longitudinally extending pads or cavities 30, 31, 32 which are elongated in the direction of movement of the carrier 14. Capillary passages 33, 34 and 35 extend from the cavities and intersect to a common supply passage 36 and in turn to a manifold 37.

Manifold 37 is of sufficient size to provide adequate fluid for maintaining the pressure as presently described in the cavities. The length and diameter of the capillaries 33–35 is such that when the cavities are uncovered the fluid flowing to the cavities such as hydraulic fluid is at atmospheric pressure in the cavities.

For larger machines wherein greater stability is desired additional pads or cavities 40 may be provided along members 41 extending along the machine and associated with surfaces 42 on each pallet. Pads 40 are supplied with fluid from manifolds, not shown.

As shown in FIG. 1, the length of a fixture pallet 14 embraces several cavities. That is, at a given time, a plurality of cavities on each surface of each way will be closely covered (on the order of a few thousandths of an inch of clearance between a way surface and complementary surface of the pallet) by any pallet engaged by the ways. Typically, there will be a plurality of pallets engaging the ways at a given time. It is a distinct feature of the invention that the pallets are so spaced apart that a substantial fraction of the cavities are not covered by any pallet at a given time.

When the machine is functioning, a fluid (typically liquid such as lubricating oil but gas is also contemplated) is pumped at suitable pressure into the header pipes 37 of both ways. Fluid is transmitted from the headers 37, through the capillaries to all the cavities at all times. Regarding the uncovered cavities, fluid will emerge from them at substantially atmospheric pressure. However, the relatively small diameter of the capillaries will provide sufficient pressure drop to assure maintenance of substantial pressure in the headers 37. This, of course, presupposes adequate volume of flow from the pump or other source into the headers to sustain this continuous emission from the open cavities and still maintain the desired header pressure. Regarding the covered cavities, a very much lower volumetric rate of flow exists. This is because the fluid must flow in a thin film between the way and the covering surface. Of course, the effluent fluid eventually reaches atmospheric pressure at the boundaries of the covering surfaces. This greatly reduced flow rate causes much less pressure drop in the capillary between header and cavity. Consequently, the pressure existing in a covered cavity approaches that in the header itself. Following general hydrostatic principles, the pressure in a covered cavity is exerted normal to the surface forming the cover. The force consequent from this pressure is the pressure multiplied by the area of the cavity.

Figure 5:
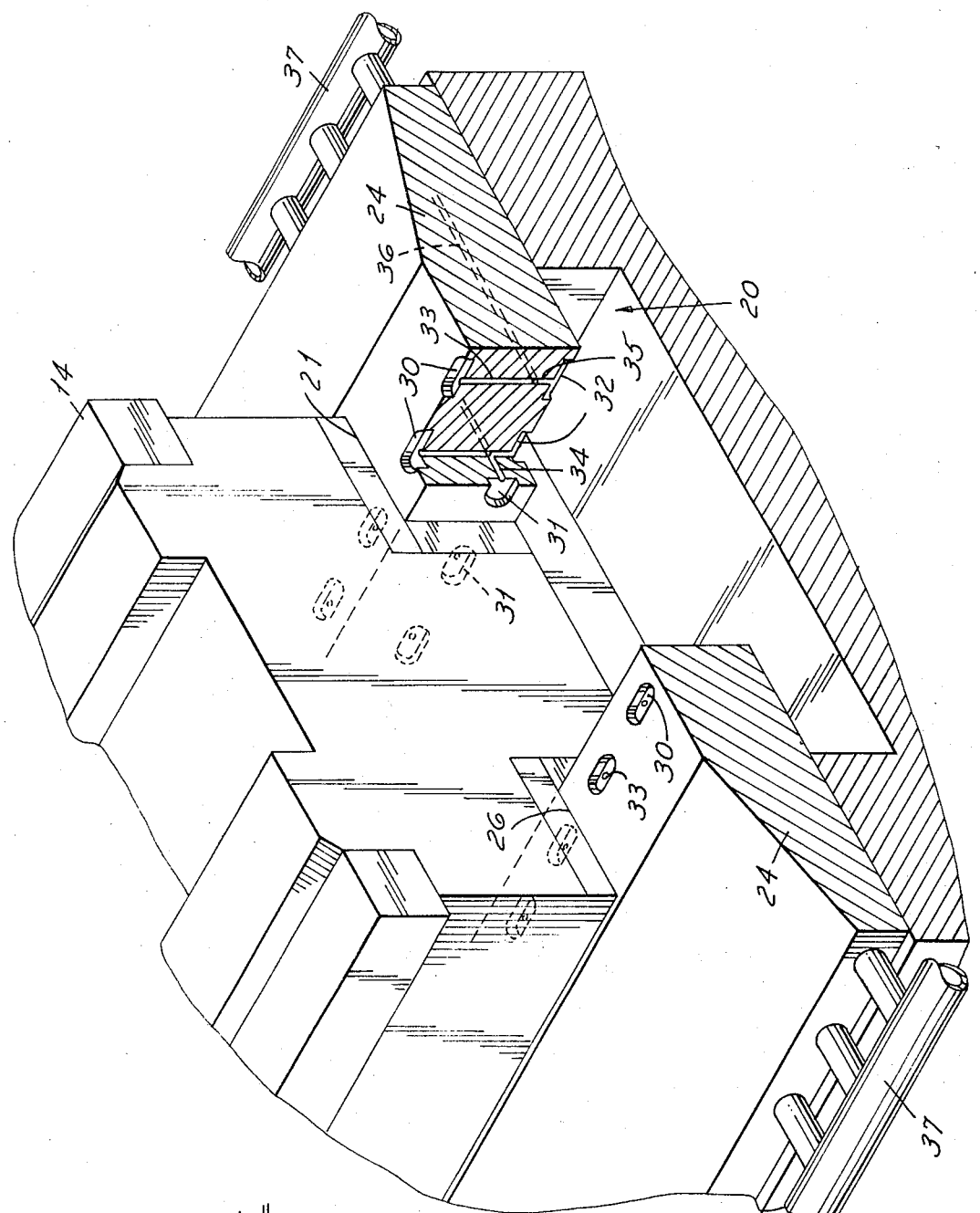
FIG. 5 is a fragmentary part sectional perspective view.

Referring generally to the figures, and particularly to FIGS. 2 and 5, the forces in the top cavities 30 are upward, tending to lift the pallet 14 and any load it may be carrying. At the same time forces due to bottom cavities 32 are downward opposing the upward forces due to cavities 30 and being added to the weight of pallet 14 and its load. From FIGS. 2–5, it is seen that the upward acting cavities 30 may have substantially larger areas than do the downward acting cavities 32. Therefore, the net result of these forces is upward when, and if, the pressures are equal in the cavities. The weight of pallet 14 and its burden tends to offset the net hydrostatic forces. Because of the substantial length of capillaries connecting a cavity 30 with its companion cavity 32, the pressure in these two are not necessarily identical.

If the weight of pallet 14 and its load exceeds the net upward force due to equal pressures in cavities 30 and 32, the pallet will move downward slightly (perhaps on the order of less than a thousandth of an inch). This downward motion reduces the gap between cavity 30 and its covering surface thus creating slightly greater restriction to flow from cavity 30 and hence raising the pressure in that cavity. At the same time, the gap between cavity 32 and its cover is correspondingly increased allowing a reduction of pressure in the cavity 32. As above noted, it is possible for this difference to exist because of the altered rates of flow in the capillaries above and below the feeder capillary 36. The altered relation of pressures above results in a new net upward hydrostatic force just sufficient to match the excess weight of pallet 14 and its load.

If the pallet 14 and its load is or becomes less than that assumed for equal gaps, the reverse of the action described occurs and the pallet 14 rises slightly to a new stable position.

By theory and experience, it is known that the relations among header pressure, fluid rate available to the header, capillary diameter and length, and cavity geometry can be so designed as to hold the pallet height within very small, much less than a thousandth of an inch variations with normal changes in the loading of the pallets 14.

The high stability makes this system suitable for holding workpieces for machining operations along the way-guided travel of the pallets. Note that tool reaction forces may contribute to the variations in effective weights of the pallets and their loads.

In performing the design calculations discussed, it is assured that no force variations (other than breakdown conditions) will be such as to destroy completely the gap between any cavity and its cover. Thus, there will always be flow of fluid from all covered cavities. This assures complete lubrication at all times between the pallets 14 and the slideways. There can be no metal-to-metal contact and the motion of the pallets along the ways approaches frictionlessness. This is a very important feature of construction as here described.

The lateral path guidance of the pallets 14 is also accomplished by the same principle of opposed pressure compensation. As best shown in FIG. 2, the lateral position of pallet 14 is controlled by opposed forces due to pressures in the cavities 31 spaced along the two parallel slideways. The two slideways are rigidly mounted on a base and held parallel to each other. The pressures of the two rows of cavities 31 are applied to vertical surfaces in recesses of pallet 14. The two rows of cavities 31 are supplied with pressurized fluid from separate headers 37 but the two headers are supplied from a common fluid source and at substantially equal pressures. The compensating of forces laterally are achieved according to the same principle already explained except that the action seems somewhat less direct because of the two headers. Also, lateral compensation may seem to disturb the pressures available for vertical compensation. However, it is to be recalled that there is a measure of decoupling of pressure from capillaries 33, 34, 35 through capillaries 36 to the cavities. By proper and known design practice, it is practical to maintain both vertical and horizontal pressure compensation by the arrangement shown and described. Lateral stabilization allows application of tool reaction forces laterally of the line of travel of the pallets and still accomplish high accuracy of machined dimensions. Lubrication is then assured over the vertical complementary surfaces in the same way as described for the horizontal.

Since several groups of cavities are included along the length of a pallet, the self-compensating process described is effective to prevent either horizontal tilt or lateral skew of the pallets. The effluent from both the uncovered and covered cavities is directed by surfaces in the base to a common sump from which it can be pumped and filtered and then reused. In at least some cases, the same fluid can be used in the guide-way system (described) and in the tool coolant system. In this case, there can be a common return sump and the possibility of contamination of either fluid by the other is avoided.

Thus, in accordance with this design, some of the pressure cavities are uncovered at a given time. In addition, the use of long capillaries is required in place of simple orifices to permit uncovering cavities without causing violent jet effluent and undue loss of header pressure.

For larger machines wherein the pallets are large and heavy, similar slideways may be provided on the lower reach of chain 11. In addition, the invention is applicable to machines wherein the axes of the sprockets 12 are other than horizontal.

I claim:

1. In a broaching machine, the combination comprising a base, an endless broaching chain mounted on said base, a plurality of carriers mounted at longitudinally spaced points on said chain for supporting one of a workpiece and a broaching tool, a mounting fixture positioned along a portion of the path of the carriers for supporting the other of a workpiece and broaching tool, means defining a slideway along the path of the carriers adjacent the fixture, said slideway having a plurality of planar surfaces for supporting and guiding said carriers, said carriers having complementary surfaces to said slideway planar surfaces, each of said slideway planar surfaces having longitudinally spaced cavities therein and capillary fluid passages associated therewith for supplying fluid to said cavities, the length and diameter of the capillary fluid passages and the size of the cavities being such that when a cavity is uncovered due to the absence of a carrier thereover, fluid can flow to the cavity freely and be at atmospheric pressure in the cavity, the length of each carrier being such that it covers a plurality of longitudinally spaced cavities as it is moved past the work station along said slideway, the length of the slideway being such that a plurality of cavities are uncovered at any moment of time during which a carrier is moved along said slideway, and means for supplying fluid to said cavities at least when a carrier is on said slideway such that each carrier is supported in stable, accurate frictionless relation to the slideway by fluid flow from said cavities between the complementary surfaces of said slideway and carrier.

2. The combination set forth in claim 1 wherein the length of said slideway is many times the length of said carrier.

3. The combination set forth in claim 1 wherein said cavities are elongated in a direction of movement of the carrier.

4. The combination set forth in claim 1 wherein said capillary fluid passages for supplying fluid to said cavities are supplied through one or more manifolds.

5. In a broaching machine, the combination comprising a base, an endless broaching chain mounted on said base, a plurality of carriers mounted at longitudinally spaced points on said chain for supporting a broaching tool, a mounting fixture positioned along a portion of the path of the carriers for supporting a workpiece, means defining a slideway along the path of the carriers adjacent the fixture, said slideway having a plurality of planar surfaces for supporting and guiding said carriers, said carriers having complementary surfaces to said slideway planar surfaces, each of said slideway planar surfaces having longitudinally spaced cavities therein and capillary fluid passages associated therewith for supplying fluid to said cavities, the length and diameter of the capillary fluid passages and the size of the cavities being such that when a cavity is uncovered due to the absence of a carrier thereover, fluid can flow to the cavity freely and be at atmospheric pressure in the cavity, the length of each carrier being such that it covers a plurality of longitudinally spaced cavities as it is moved past the work station along said slideway, the length of the slideway being such that a plurality of cavities are uncovered at any moment of time during which a carrier is moved along said slideway, and means for supplying fluid to said cavities at least when a carrier is on said slideway such that each carrier is supported in stable, accurate frictionless relation to the slideway by fluid flow from said cavities between the complementary surfaces of said slideway and carrier.

6. The combination set forth in claim 5 wherein the length of said slideway is many times the length of said carrier.

7. The combination set forth in claim 5 wherein said cavities are elongated in a direction of movement of the carrier.

8. The combination set forth in claim 5 wherein said capillary fluid passages for supplying fluid to said cavities are supplied through one or more manifolds.

9. In a broaching machine, the combination comprising a base, an endless broaching chain mounted on said base, a plurality of carriers mounted at longitudinally spaced points on said chain for supporting one of a workpiece, and a broaching tool, a mounting fixture positioned along a portion of the path of the carriers for supporting the other of a workpiece and broaching tool, means defining a slideway along the path of the carriers adjacent the fixture, said slideway having a plurality of planar surfaces for supporting and guiding said carriers, said carriers having complementary surfaces to said slideway planar surfaces, each of said slideway planar surfaces having longitudinally spaced cavities therein and capillary fluid passages associated therewith for supplying fluid to said cavities, the length and diameter of the capillary fluid passages and the size of the cavities being such that when a cavity is uncovered due to the absence of a carrier thereover, fluid can flow to the cavity freely and be at atmospheric pressure in the cavity, the length of each carrier being such that it covers a plurality of longitudinally spaced cavities as it is moved past the work station along said slideway, the length of the slideway being such that a plurality of cavities are uncovered at any moment of time during which a carrier is moved along said slideway, and means for supplying fluid to said cavities at least when a carrier is on said slideway such that each carrier is supported in stable, accurate frictionless relation to the slideway by fluid flow from said cavities between complementary surfaces of said slideway and carrier, the length of said slideway being many times the length of said carrier, said cavities being elongated in a direction of movement of the carrier, said capillary fluid passages for supplying fluid to said cavities being supplied through one or more manifolds.

* * * * *